July 21, 1959 F. A. PUTZ 2,896,008

SEAL OF BUSHING TO CASING OF ELECTRICAL APPARATUS

Filed Dec. 29, 1953

FRANK A. PUTZ
INVENTOR.

BY Lee H. Kaiser

ATTORNEY

United States Patent Office 2,896,008

Patented July 21, 1959

2,896,008

SEAL OF BUSHING TO CASING OF ELECTRICAL APPARATUS

Frank A. Putz, Wauwatosa, Wis., assignor to McGraw-Edison Company, a corporation of Delaware Application December 29, 1953, Serial No. 401,025

11 Claims. (Cl. 174—50.56)

This invention relates to sealed electrical apparatus and in particular to a method and means for sealing a ceramic insulating bushing to a metallic case enclosing electrical apparatus.

Capacitors, transformers, and other electrical apparatus are housed in metallic casings having hermetically sealed bushings extending therethrough. The bushings on power capacitors are conventionally of wet process porcelain having one or more metalized bands over the glaze to facilitate the bonding of the bushing to the metal of the casing. The bushings are hermetically sealed by a solder joint to a cover for the casing before the cover is welded to the metallic tank. A high vacuum is drawn on each capacitor casing prior to its impregnation, and unless a substantially perfect hermetic seal is obtained at the bushing, it is impossible to obtain the desired degree of evacuation. One way to assure a high percentage of satisfactory seals is to provide a circumferential bond which is long in the axial direction. Usually the cover is mechanically stressed and pressure tested to assure that a perfect bond has been accomplished before the cover is welded to the tank. The final assembly of cover and tank is then submerged in water and pressure tested prior to placement in the preheat, drying, and impregnating ovens.

The joint of the bushing to the cover is heated to near the melting point of the solder in the process of welding the cover to the tank, and occasionally leaks in the solder joint of the bushing are caused by the welding operation which are not detected until the final assembly of tank and cover is submerged in water and pressure tested. Leaks in the solder joint which are too minute to be detected by the pressure test under water are occasionally revealed when a vacuum is drawn on the casing prior to impregnation with dielectric fluid. In the past, a leak at the solder joint of the bushing has necessitated the scrapping of the entire capacitor. Heretofore, it has been impossible to repair a capacitor by replacement of a bushing because of danger of solder dropping into the capacitor casing and creating short circuits between electrodes. Similarly, it has been considered inadvisable to repair capacitors which had bushings broken or otherwise damaged in the field.

It is an object of the invention to provide a method and means of hermetically sealing a bushing to the metallic casing of sealed electrical apparatus which will prevent solder from dropping into the casing and creating the possibility of a short circuit of the enclosed electrical apparatus.

In both the operation of making the original bond of bushing to cover and in the operation of replacing a faulty bushing, the possibility exists that minute amounts of solder will leak through the solder dam and solidify on the lower surface of the bushing. Such solder formation reduces the clearance between the conductor and casing and permits arcing to occur at low potentials.

It is a further object of the invention to provide a method and means for forming a positive dam for solder in the hermetic sealing of an electrical bushing to the casing of electrical apparatus.

Other objects of this invention will become apparent from the following description when taken in conjunction with the accompanying drawing, in which.

Figure 1:
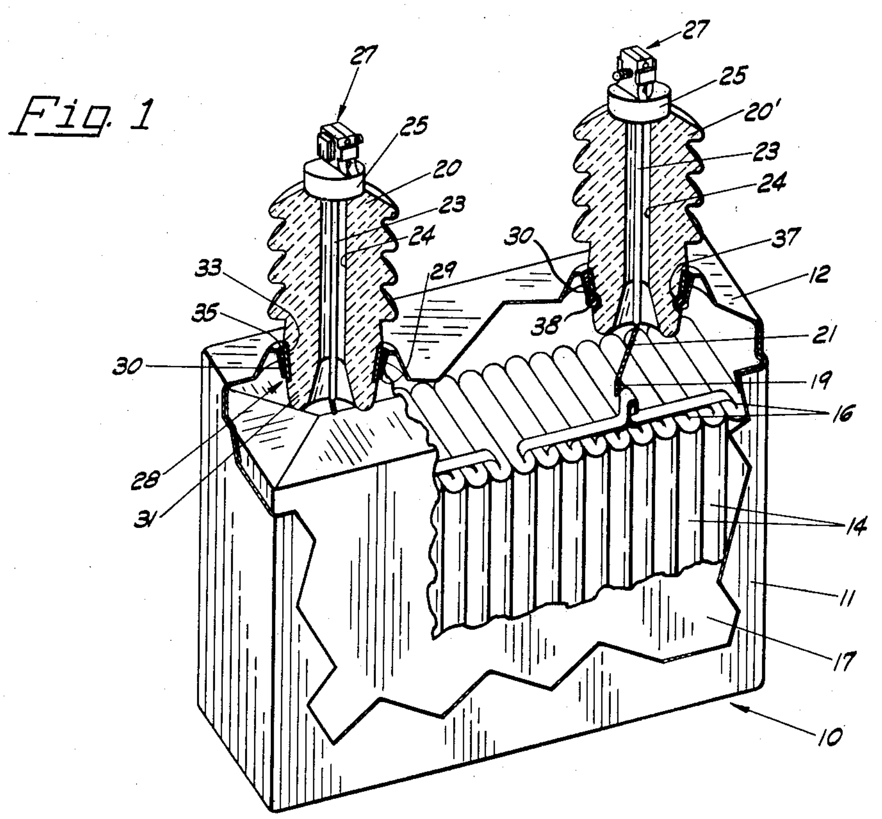
Fig. 1 is a perspective view, partly in section, of a capacitor in which the electrical bushing on the left is bonded to the casing in conventional manner and in which the bushing on the right is bonded to the casing in accordance with the teaching of the invention.

Referring to the drawing, it will be seen that the capacitor 10 is provided with a metal tank 11 having a cover 12 welded thereto in the usual manner. Both the tank 11 and the cover 12 are preferably fabricated of stainless steel. The capacitor 10 comprises a plurality of individual capacitor packs 14 each wound from aluminum foils separated by dielectric material which preferably may consisting of several thicknesses of very thin, high quality paper. In the usual manner, the interleaved foils and dielectric material are wound on a mandrel with electrodes inserted at spaced intervals in contact with the foils during the winding operation. A plurality of electrodes 16 are conventionally used in contact with each foil to reduce any inductive effect and to divide the current density in the electrode area of the foil. After the winding operation is completed, the winding assembly is compressed into a flat capacitor pack 14.

A plurality of packs 14 are disposed within the casing formed by the tank 11 and cover 12 and insulated therefrom by a plurality of layers 17 of suitable insulating material such as pressboard. To provide the desired capacitance and voltage rating for the capacitor, packs 14 are connected in series and parallel arrangement by connecting electrodes 16 together internally of the casing. The flexible electrodes 16 are manually brought together, twisted around a terminal tab 19, and spot welded to the tab.

Electrical bushings 20 and 20' hermetically sealed to the cover 12 provide connections to an external circuit. The bushings 20 and 20' are identical except for a circumferential groove 37 provided in bushing 20' as discussed hereinafter, and the same reference numerals are used to identify like parts of the bushings. The bushing 20 on the left in Fig. 1 is bonded to the casing in conventional manner, whereas the bushing 20' on the right is sealed to the casing in accordance with the teaching of the invention. A wire lead 21, preferably of the braided copper type, soldered at one end to the terminal tab 19 is crimped at the opposite end to the inner end of a metallic terminal tube 23. The tube 23 extends through an axial compartment 24 in the bushing 20 and projects through a metallic cap 25 which is hermetically sealed to the bushing 20 by a solder joint 26 (see Fig. 2). A solder seal 36 bonds the tube 23 to the cap 25. A clamp type terminal 27 adapted to accommodate a wide range of conductor sizes is provided on the cap 25.

The bushings 20 and 20' are of the ceramic type, known to the trade as porcelain bushings. Openings 28 are provided through the cover 12 to receive the bushings 20 and 20'. The edge 29 of the cover 12 at the opening 28 is bent in a direction toward the inside of the casing to form an inverted V-shaped ring 30 about the periphery of the opening. The opening 28 thus flares toward the exterior of the casing. The lower end 31 of the bushing 20 which projects through the opening 28 is frusto-conical flaring toward the exterior of the casing and has a plurality of metalized layers 33 electroplated or otherwise deposited thereon opposite the inverted V-shaped ring 30 to facilitate bonding to the ceramic bushing.

A similar metalized circumferential band 34 is provided near the upper edge of the bushing 20. In one conventional manufacturing procedure, the bushing 20 is hermetically sealed to the cover 12 before the cover is welded to the casing. The cover 12 and bushing 20 are assembled in a fixture which provides a dam between cover 12 and bushing 20 for the solder, and a low melting point solder is flowed between the metalized band 33 and the inverted V-shaped ring 30 to effect a hermetic seal 35 between cover and bushing. The wire lead 21 is then crimped to the terminal tube 23. After preheating and drying, the casing is impregnated with a suitable dielectric fluid, preferably a chlorinated cyclic hydrocarbon.

However, once the cover 12 is welded to the tank 11, it has heretofore been impossible to replace the bushing 20 without the danger of solder dropping into the casing and creating the possibility of a short circuit of the electrodes 16. The impossibility of providing an adequate dam for the solder during the process of sealing bushing 20 to cover 12 has heretofore made it impossible to replace a bushing and has necessitated the scrapping of capacitors having a bushing damaged in service or a minute leak in the bushing-to-casing solder joint.

Figure 2:
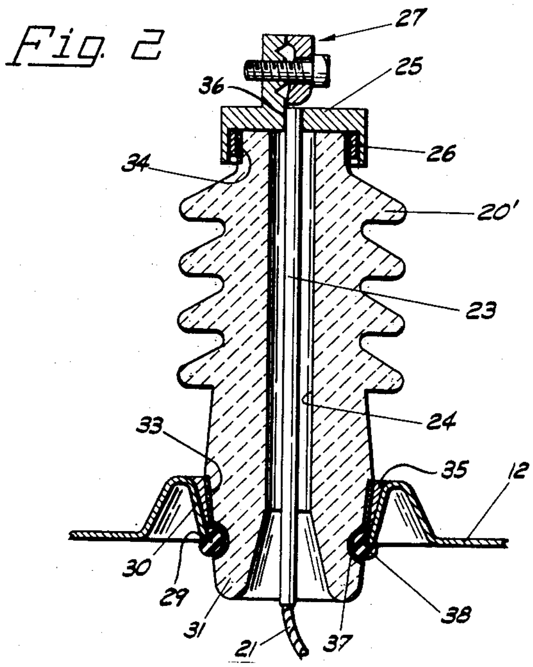
Fig. 2 is an enlarged view in section of the seal made in accordance with the teaching of the invention between the right hand bushing and the metal case of the apparatus illustrated in Fig. 1.
Figure 3:
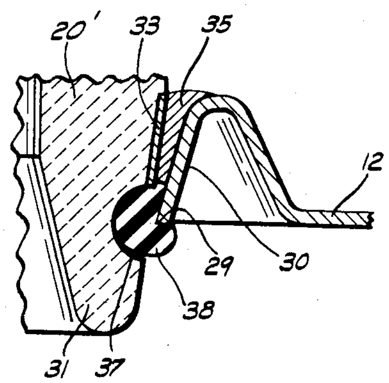
Fig. 3 is an enlarged view in section showing, in particular, the resilient ring in compressed engagement with the conically flared wall of the casing.

The foregoing discussion relates to the construction of electrical power capacitors generally and does not constitute a part of the present invention. The bushing 20 on the left in Fig. 1 is sealed to the metallic casing by conventional means as described above, whereas the bushing 20′ on the right is hermetically bonded to the casing in accordance with the teaching of the invention. Referring in particular to Figs. 2 and 3, the details of the preferred embodiment of the means of the invention for sealing a bushing to a metallic casing are clearly shown. A circumferential groove 37 is provided in the frusto-conical portion 31 of the bushing 20′ below the metalized band 33. Inserted in the groove 37 is a resilient ring 38 preferably of circular cross section.

In order to seat the ring 38 firmly within the groove 37, the inner diameter of ring 38 is made smaller than the diameter of groove 37, and the depth of the groove 37 is made greater than the cross-section radius but smaller than the cross-section diameter of the ring 38. The bushing 20′ at the groove 37 is smaller in diameter than the edge 29 of the cover 12 at the inner end of the inverted V-ring 30, whereas the outside diameter of the ring 38 is larger than the inner diameter of the bent-in edge 29. The ring 38 thus protrudes beyond the frusto-conical face 31 of the bushing 20′ and abuts against the inner edge 29 of the cover at the inverted V-shaped ring 30 when the bushing 20′ is assembled to the casing.

The ring 38 should be of material which is highly resistant to heat and not affected in the range of temperatures corresponding to the melting point of the solder. In addition, the material should not be affected by oil or halogenated cyclic compounds commonly employed as dielectrics. Silicone rubber is a suitable material for the ring 38.

If a capacitor having a bushing damaged in the field is to be repaired, it is first necessary to drain the liquid dielectric from the casing. The casing is then inverted and heat applied to the solder joint between the faulty bushing and the casing. The melted solder drops away from the inverted casing, thus eliminating any possibility of solder getting into the interior of the casing and short circuiting between electrodes. The damaged bushing is removed and the electrical lead 21 to the capacitor packs 14 is severed.

It is apparent that in replacing a bushing on a capacitor in which the cover 12 is welded to the tank 11, the cap 25 can be soldered to the bushing 20′ and to the terminal tube 23 before the severed wire lead 21 is crimped to the tube 23. However, this requires a comparatively long wire lead 21 which increases the danger of electrical breakdown between electrical lead and casing.

In the preferred embodiment of the invention, the hollow terminal tube 23 is first inserted through the cover opening 28 and crimped to the severed lead 21. A bushing 20′ having a resilient ring 38 in the groove 37 is then inserted over the tube 23 and pressed through the opening 28 until the resilient ring 38 is deformed against the edge 29. Fig. 3 is an enlarged view of the resilient ring 38 compressed between the bushing 20′ and the edge 29. It will be noted that a portion of the resilient material is deformed upward into the annular space separating the band 33 and the conically flaring wall of the inverted V-shaped ring 30. Considerable pressure is exerted in forcing the bushing 20′ into position. However, as described above, the depth of the groove 37 is greater than the radius of the ring 38. Consequently, the ring 38 is firmly and deeply seated in the groove 37 and resists removal from groove 37 by forces parallel to the frusto-conical surface 31 of the bushing 20′. The bushing 20′ is thus held firmly against the edge 29 by the forces tending to relieve the strain in the deformed resilient ring 38. A positive dam is thus provided for the solder which eliminates any possibility of solder dropping into the electrical apparatus and short circuiting electrodes. The annular space above the ring 38 between busing 20′ and the inverted V-shaped ring 30 is filled with solder 35 which readily bonds to the metalized band 33.

In succeeding operations, a metallic cap 25 is inserted over the hollow terminal tube 23 and manually soldered to the bushing 20′ at the metalized band 34. The terminal tube 23 is then severed, crimped, and manually soldered to the cap 25. The repaired capacitor then undergoes the conventional manufacturing steps of preheating, drying, and impregnation with fluid dielectric.

The above described method and means for forming a joint between members is effective for maintaining the casing of electrical apparatus hermetically sealed. While the invention has been described with reference to a capacitor, it will be appreciated that such reference is made only for the purpose of illustrating the invention. The means and method described for sealing can be utilized in connection with any electrical apparatus wherein it is required to provide a joint between an electrical bushing and the casing. Although the preferred form of the invention has been described in relation to the repair of capacitors, it will be appreciated that bushings can advantageously be sealed to the casing during original manufacture in accordance with the teachings of the invention. In order to set forth the best mode for carrying out the invention, the term "solder" has been used throughout the specification to describe the joint between bushing and casing. However, it will be appreciated that the invention is equally effective to prevent leakage of other sealing compound than solder into the electrical casing.

Although a specific embodiment of the invention has been illustrated and described, it is to be understood that it is not limited to the exact details of construction shown, but that in its broadest aspect, it includes all other modifications and embodiments which fall within the scope of the appended claims.

What I claim as new and desire to secure by Letters Patent of the United States is:

1. The method of forming a dam between an electrical apparatus casing having an opening therethrough and an electrical bushing extending through the opening, said opening being defined by a wall conically flared outwardly of said casing and having an inner marginal edge, which comprises the steps of forming a circumferential groove in the exterior periphery of said bushing intermediate its ends, fitting into said groove a resilient ring larger in diameter than said edge, and pressing said bushing into said opening to compress said ring against said wall until a portion of said ring extends beyond and beneath said edge and the peripheral portion of said bushing above said groove and said ring is opposite and in radially spaced relation to said wall, whereby said portion of said ring serves as locking means to resist withdrawal of said bushing from said casing.

2. The method of sealing the casing of enclosed electrical apparatus to a bushing extending through an opening in said casing, said opening being defined by a wall conically flared outwardly of said casing and having an inner marginal edge, which comprises the steps of forming a circumferential groove in the exterior periphery of said bushing intermediate its ends, fitting into said groove a resilient ring larger in diameter than said edge, pressing said bushing into said opening to compress said ring against said wall until a portion of said ring extends beyond and beneath said edge and the peripheral portion of said bushing above said groove and said ring is opposite and in radially spaced relation to said wall, and filling the space exterior of said ring between said peripheral portion of said bushing and said wall with a sealing compound.

3. The method of solder sealing the metallic casing of enclosed electrical apparatus to a bushing surrounding an electrical lead to said apparatus and extending through an aperture in said casing, which comprises the steps of bending said casing at said aperture in a direction toward the inside of said casing to provide an outwardly flaring wall defining said aperture and having an inner marginal edge, forming a circumferential groove in the exterior periphery of said bushing, fitting into said groove a silicone rubber ring larger in diameter than said edge, electrically connecting said lead to said apparatus, deforming said ring against said wall by pressing said bushing into said opening until a portion of said ring extends beyond and beneath said edge and the peripheral portion of said bushing above said groove and said ring is opposite and in spaced relation to said wall, and filling the annular space above said ring between said peripheral portion of said bushing and said wall with solder.

4. The method of replacing a faulty electrical bushing which extends through and is bonded by solder to an outwardly conically flared wall having an inner marginal edge and defining an opening in the casing of electrical apparatus immersed in a fluid dielectric within said casing, which comprises the steps of draining said dielectric fluid from said casing, melting the solder between said bushing and said wall while said casing is inverted, whereby the melted solder falls free of said casing, disconnecting said bushing from said apparatus, removing said bushing from said casing, forming a circumferential groove in the exterior periphery of a second bushing surrounding an electrical conductor and having a peripheral portion above said groove of smaller diameter than said wall, fitting within said groove a silicone rubber ring larger in diameter than said edge, electrically connecting said conductor to said apparatus, pressing said second bushing into said opening to compress said ring against said wall until a portion of said ring extends beyond and beneath said edge and said peripheral portion of said second bushing is opposite and in spaced relation to said wall, filling the annular space above said ring between said peripheral portion of said second bushing and said wall with solder, and filling said casing with dielectric fluid.

5. In electrical apparatus, in combination, a casing enclosing an electrical device and having an opening therein defined by a wall conically flared outwardly of said casing and having an inner marginal edge, an electrical bushing having a circumferential groove intermediate its ends and extending through said opening, and a resilient ring within said groove compressed against said wall and providing the sole support for said bushing on said casing, said ring having a portion extending beyond and beneath said edge serving as locking means to prevent withdrawal of said bushing from said casing, whereby said ring provides a dam which prevents leakage into the interior of said casing, the portion of said bushing above said groove and said ring being opposite and in radially spaced relation to said conically flared wall.

6. In electrical apparatus, in combination, a casing enclosing an electrical device and having an aperture therein defined by a wall conically flared outwardly of said casing and having an inner marginal edge, an electrical bushing having a circumferential groove intermediate its ends and extending through said aperture, a resilient ring within said groove deformed against said wall and having a portion extending beyond and beneath said edge serving as locking means to resist withdrawal of said bushing from said casing, the peripheral portion of said bushing above said groove and said ring being opposite and in radially spaced relation to said wall and providing an annular space therebetween, and sealing compound filling said annular space confined between said wall and said peripheral portion of said bushing.

7. In electrical apparatus, in combination, a casing enclosing an electrical device and having an opening therein defined by a wall conically flared outwardly of said casing and having an inner marginal edge, an electrical bushing connected to said apparatus and extending through said opening, said bushing having a circumferential groove intermediate its ends, a heat resistant resilient ring within said groove deformed against said wall and having a portion extending beyond and beneath said edge serving as locking means to prevent withdrawal of said bushing from said casing, a circumferential metalized coating on said bushing above said groove and said ring and opposite and in radially spaced relation to said wall, and a joint of solder above said ring between said coating and said wall.

8. In an electrical apparatus housed in a sealed casing having an opening therein defined by a wall conically flared outwardly of said casing and having an inner marginal edge, an electrical bushing extending through said opening and having a circumferential groove intermediate its ends, a circumferential metalized coating on said bushing opposite said wall, and a heat resistant resilient ring of circular cross section within said groove and having an outer diameter larger than the diameter of said edge, said groove being deeper than the cross-sectional radius of said ring but shallower than its cross-sectional diameter, said ring being in compressed engagement with said wall and providing the sole support for said bushing on said casing, said ring having a portion extending beyond and beneath said edge serving as locking means to prevent withdrawal of said bushing from said casing and forming a dam to prevent leakage of solder into the interior of said casing, said circumferential coating on said bushing being above said ring and opposite and in radially spaced relation to said conically flared wall.

9. In an electrical apparatus, the combination comprising a metallic casing enclosing an electrical device and having an opening therein for the passage of an electrical conductor, said opening being defined by a wall conically flared outwardly of said casing and having an inner marginal edge, an electrical conductor extending through said opening and electrically connected to said device, a bushing of ceramic material surrounding said conductor and disposed to extend through the opening, said bushing having a circumferential groove intermediate its ends, a silicone rubber ring within said groove of larger diameter than said edge and deformed against said wall and having a portion extending beyond and beneath said edge serving as locking means to resist withdrawal of said bushing from said casing, a circumferential metalized coating on said bushing above said circumferential groove and said ring and opposite and in radially spaced relation to said wall, and a joint of solder exterior of said ring between said coating and said wall.

10. A capacitor comprising, in combination, a sealed casing having an opening for the passage of an electrical conductor, a plurality of electrical capacitor packs disposed within the casing, a liquid dielectric within the casing immersing said capacitor packs, said opening being defined by a wall conically flared outwardly of said casing and having an inner marginal edge, an electrical bushing connected to the capacitor packs and extending through said opening, said bushing having a circumferential groove therein intermediate its ends, a heat resistant resilient ring within said groove deformed against said wall and having a portion extending beyond and beneath said edge serving as locking means to resist withdrawal of said bushing from said casing, a circumferential metalized coating on said bushing above said groove and said ring and opposite and in spaced relation to said wall, and a joint of solder exterior of said ring between said coating and said wall, said ring being impervious and inert to said liquid dielectric.

11. In an electrical apparatus, the combination with a casing having an aperture defined by a wall conically flared outwardly of said casing and having an inner marginal edge, of an insulating bushing positioned in said aperture and extending into said casing, said bushing having an annular groove disposed in part in said casing and in part within the confines of said wall adjacent the inside of said casing, an annular resilient ring in said groove in compressed engagement with said wall and having a portion extending beyond and beneath said edge serving as locking means to resist withdrawal of said bushing from said casing, the peripheral portion of said bushing above said groove and said ring being opposite and in radially spaced relation to said wall and providing an annular space therebetween, and a metallic filling in said annular space confined between said wall and said peripheral portion of said bushing.

References Cited in the file of this patent

UNITED STATES PATENTS

| | | |
|---|---|---|
| 1,844,304 | Welter | Feb. 9, 1932 |
| 2,050,294 | Edmonds | Aug. 11, 1936 |
| 2,052,700 | De Lange | Sept. 1, 1936 |
| 2,411,656 | Henderson | Nov. 26, 1946 |
| 2,459,193 | Sparks | Jan. 18, 1949 |

FOREIGN PATENTS

| | | |
|---|---|---|
| 6,983 | Great Britain | Mar. 20, 1911 |
| 952,243 | France | Nov. 14, 1949 |

OTHER REFERENCES

Publication: "Soldered Ceramic to Metal Seals" by A. L. Jenny, pages 154–157 in Product Engineering, December 1947 (copy available in Scientific Library 174–152).